Patented Apr. 2, 1929.

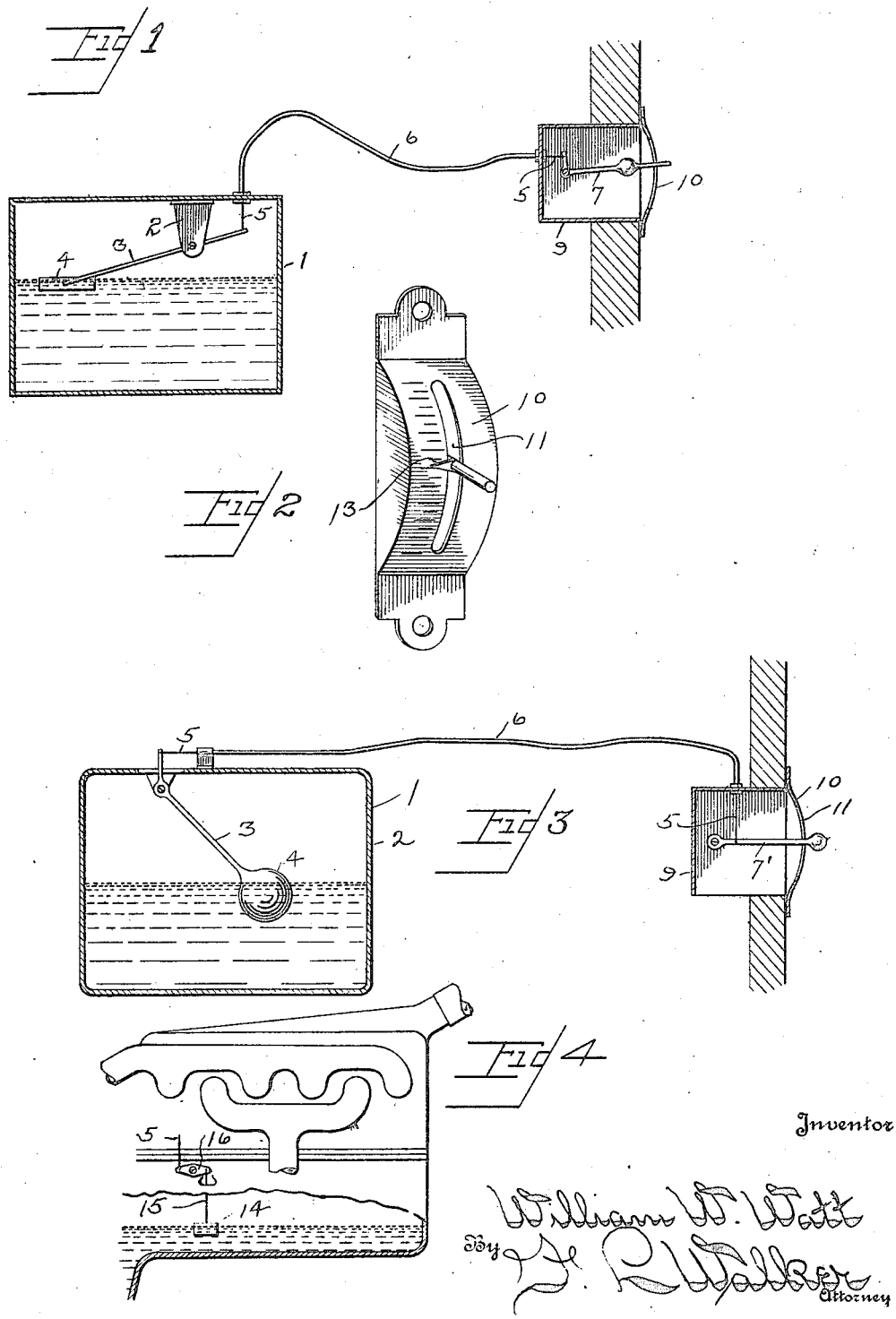

1,707,970

UNITED STATES PATENT OFFICE.

WILLIAM W. WATT, OF DAYTON, OHIO, ASSIGNOR OF ONE-HALF TO JOSEPH WEIL, OF DAYTON, OHIO; BLANCHE WEIL EXECUTRIX OF SAID JOSEPH WEIL, DECEASED.

LIQUID-LEVEL GAUGE.

Application filed July 23, 1923. Serial No. 653,243.

My invention relates to liquid level gauges and more particularly to a float operated gauge wherein the fluctuations of liquid level within a tank or container are transmitted to a distantly located indicator by the to and fro movement of an intermediate flexible transmission member.

It is recognized that the use of a float upon a pivoted arm connected to a flexible wire passing through a tubular guide conduit to a distant indicator which is actuated by the to and fro longitudinal movement of the wire has been more or less generally employed. However in most instances it has been necessary to employ spring means for taking up lost motion in the transmission wire or cable. Moreover due to the tortuous course through which the guide tube must ordinarily be conducted from the tank or reservoir to the indicating unit, particularly upon a motor vehicle, there is more or less frictional resistance to the free movement of the transmission wire or cable with the consequent tendency for the transmission element to become sluggish or to stick.

In the present construction which is primarily intended for installation upon motor vehicles for indicating upon the cowl board or dash of the vehicle the quantity of liquid contents of the fuel tank at the rear of the machine or the quantity of oil within the crank case of the motor vehicle engine, there is contemplated a construction wherein no springs or other takeup means or compensating devices are necessary and one wherein the influence of gravity upon the indicator unit is opposed to the buoyant effect of the flloat within the reservoir or container so that the float and indicator operate in opposition to each other both transmitting pulling effect to the intermediate transmission wire or cable keeping such transmission element constantly under tension. There is further contemplated means by which the transmission wire or cable and float may be manually actuated by manipulation of the indicator to insure free operation of the gauge parts and prevent lodgment and sticking thereof.

The object of the invention is to simplify the structure as well as the means and mode of operation of float actuated liquid gauges whereby they will not only be cheapened in construction, but will be more efficient in use, positive in operation, uniform in action, accurate, easily controlled, and unlikely to get out of repair.

A further object of the invention is to provide a liquid level gauge having a minimum number of operative parts and to provide for the elimination of lost motion without the use of springs or takeup devices by opposing the gravity influence upon the indicator device against the buoyant influence of the float.

A further object of the invention is to provide means for manually manipulating the gauge parts to insure freedom of operation.

With the above primary and other incidental objects in view as will more fully appear in the specification, the invention consists of the features of construction, the parts and combinations thereof, and the mode of operation, or their equivalents, as hereinafter described and set forth in the claims.

In the accompanying drawings wherein are shown the preferred but obviously not necessarily the only forms of embodiment of the invention Fig. 1 is a general view partly in section illustrating the relation and interconnection of the float unit and indicator unit. Fig. 2 is a detail perspective view of the indicator gauge plate showing the protruding end of the indicator arm adapted for manual manipulation. Fig. 3 is a view similar to Fig. 1 illustrating modifications of the arrangement and interconnection of the gauge parts. Fig. 4 shows a mode of applying the invention to gauge the oil in the crank case of an automobile engine.

Like parts are indicated by similar characters of reference throughout the several views.

While the present gauge construction is primarily intended for indicating upon the cowl board or dash of the motor vehicle the quantity of liquid contents of the fuel tank and engine crank case it is to be understood that the invention is not limited to such installation but may be applied to other liquid measuring and indicating purposes for instance installations provided with stationary tanks in liquid supply stations or storage stations.

Referring to the drawings 1 is the reservoir or supply tank the liquid contents of which are to be indicated. This may be either the fuel supply tank or the engine crank case of a motor vehicle. Pivotally mounted within the tank 1 within a suitable hanger or bracket 2 is a float arm 3 bearing at one end thereof the buoyant float 4. The float arm 3 is preferably a lever of the first order to the end of which opposite the float and beyond the pivotal point is connected a flexible transmission wire 5 adapted for alternate to and fro movement through a flexible guide tube 6 leading to a distant indicating point. While the float arm 3 is preferably of the form illustrated, that is a lever of the first order, the transmission wire 5 may be otherwise connected to afford a pulling impulse upon the transmission wire under influence of the buoyancy of the float 4. That is to say the connection is such that as the float rises it exerts a pulling effect upon the transmission wire 5 tending to move such wire toward the supply tank. The opposite end of the transmission wire 5 is connected to a pivotal indicator arm 7. In Fig. 1 this indicator arm has been shown as an elbow member or bell crank lever with the transmission wire connected to its short arm which is upturned. The arrangement of the indicator arm is such that the influence of gravity or weight of the arm 7 tends to depress the arm and exert a pulling influence upon the wire 5 in opposition to the buoyancy of the float 4. The transmission wire is so connected at its opposite ends that the indicator arm 7 tends to move the transmission wire in one direction while the buoyancy of the float 4 tends to move the same wire in the opposite direction thus subjecting the transmission wire to tension and preventing lost motion. The indicator arm 7 is mounted in a suitable housing 9 having an arcuate slotted face plate 10. This mounting or housing is to be secured to the cowl board or dash of the vehicle or other instrument board in position to be readily observed by the driver or attendant. The arm 7 extends through the slot 11 in the face plate a sufficient distance to be easily grasped by the operator's finger for manual manipulation. In the event that the operator or driver has any suspicion that the gauge is not functioning properly or is acting sluggishly a depression of the protruding end of the indicator arm 7 will exert pulling effort through the transmission wire 5 causing the float 4 to be more deeply submerged within the liquid contents measured. Upon release of the indicator arm the buoyancy of the float will exert pulling effort in the opposite direction to return the indicator arm 7 to its proper relative indicating position. By thus manually manipulating the gauge the driver may be assured of its proper functioning and if it should become retarded or arrested in its operation the manual manipulation will dislodge the parts and restore its freedom of movement. The face plate 10 is graduated to represent proportional parts of the contents of the tank or reservoir such as gallons and fractional parts thereof or to indicate fractional parts of the entire capacity as full, three-fourths full, half full, quarter full and empty. The position of the indicator arm 7 in relation with such graduations or scale markings upon the face plate indicates the quantity of the contents. To facilitate the reading of the scale the indicator arm 7 may be provided with a small pointer or finger 13 projecting laterally therefrom and overlying the scale of graduation upon the face plate.

Fig. 3 shows a modification wherein the float arm extends through the top of the reservoir or tank while at the opposite end the transmission wire is connected to the indicator arm 7' at a point intermediate its pivotal connection and its free end. The effect however is the same as before, that is to say the buoyancy of the float within the tank is opposed to the weight of the indicator arm or the influence of gravity thereon so that the indicator arm tends to pull the transmission wire in one direction while the buoyancy of the float tends to pull the same wire in the opposite direction. As in the preceding figures the indicator arm extends beyond the face plate of the body for manual manipulation to assure freedom of action.

It is customary to provide many automobile motors with a float gauge of simple form, wherein the float is provided with a stem projecting to greater or less extent from the engine crank case to indicate the depth of oil. It is proposed to utilize such float indicator by the construction shown in Fig. 4. In this modification, 14 is the usual float and 15 the stem extending to the interior of the crank case. An actuating lever 16 is pivoted medially to a suitable support and the float stem 15 is connected to one end of the lever 16, while the transmission wire 5 is connected to the opposite end. The operation is that before described. The float 14 by its upward pushing effect upon the lever 16 maintains the wire 5 under tension, to support the distantly located indicator arm 7 in elevated relation.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and mode of construction herein disclosed comprises the preferred form of several modes of putting the invention into effect and the invention is, therefore, claimed in any of its forms or modifications within the legitimate and valid scope of the appended claims.

Having thus described my invention, I claim:

1. In a liquid gauge, by which the fluctuations of liquid level within a container are indicated at a distant point, including a float within the container adapted to rise and fall with the liquid level, a pivoted lever of the first order by which the float is carried, and by means of which the rising movement of the float is transformed into a pulling influence upon a motion transmitting element, a distantly located vertically movable weighted pivoted arm normally tending to descend under the influence of gravity, and an intermediate motion transmitting strand connecting the weighted indicator arm and the float actuated lever, said strand being subjected to pulling influence in one direction by the buoyancy of the float and likewise subjected to pulling influence in the opposite direction by the influence of gravity upon the weighted indicator arm and thereby being maintained under constant tension by which the weighted indicator is upheld against the influence of gravity by the buoyancy of the float, said indicator arm being caused to rise in unison with a rising movement of the float and permitted to descend in unison with the descent of the float.

2. In a liquid gauge by which the fluctuations of liquid level within a container are indicated at a distant point, including a float rising and falling with the liquid level, an oscillatory lever of the first order to one arm of which the float is connected, a distantly located weighted indicator, and an intermediate motion transmitting strand connecting the opposite arm of the lever with the indicator upon which the float exerts a constant pulling tension in one direction by the buoyancy of the float and upon which the indicator exerts a constant pulling tension in the opposite direction by gravity acting upon the weighted indicator, the float and weighted indicator both rising and both falling in unison with each other in accordance with fluctuations of the fluid level.

In testimony whereof, I have hereunto set my hand this 14th day of July, A. D. 1923.

WILLIAM W. WATT.